W. J. DUNHAM.
SOIL PULVERIZER.
APPLICATION FILED MAR. 27, 1911.
1,023,139.
Patented Apr. 16, 1912.
2 SHEETS—SHEET 2.
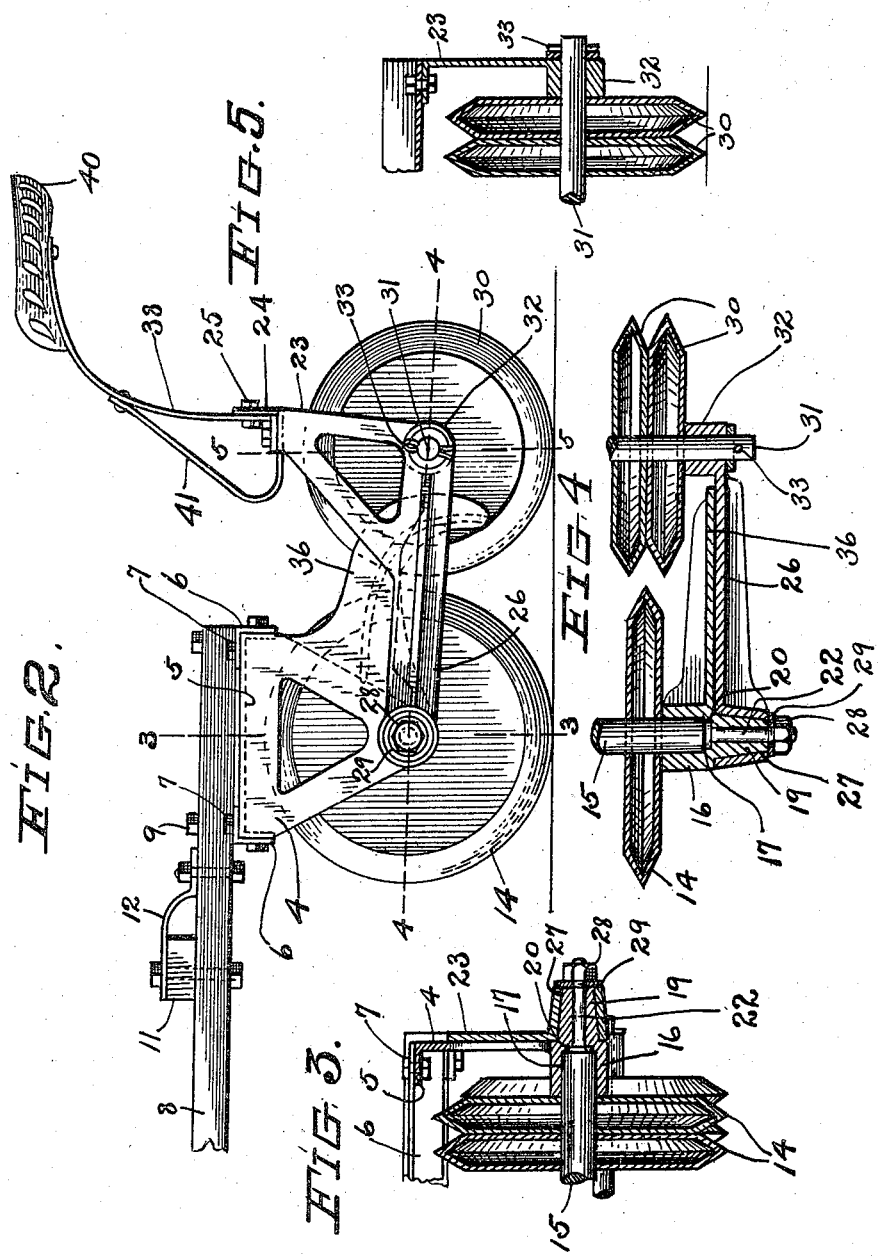

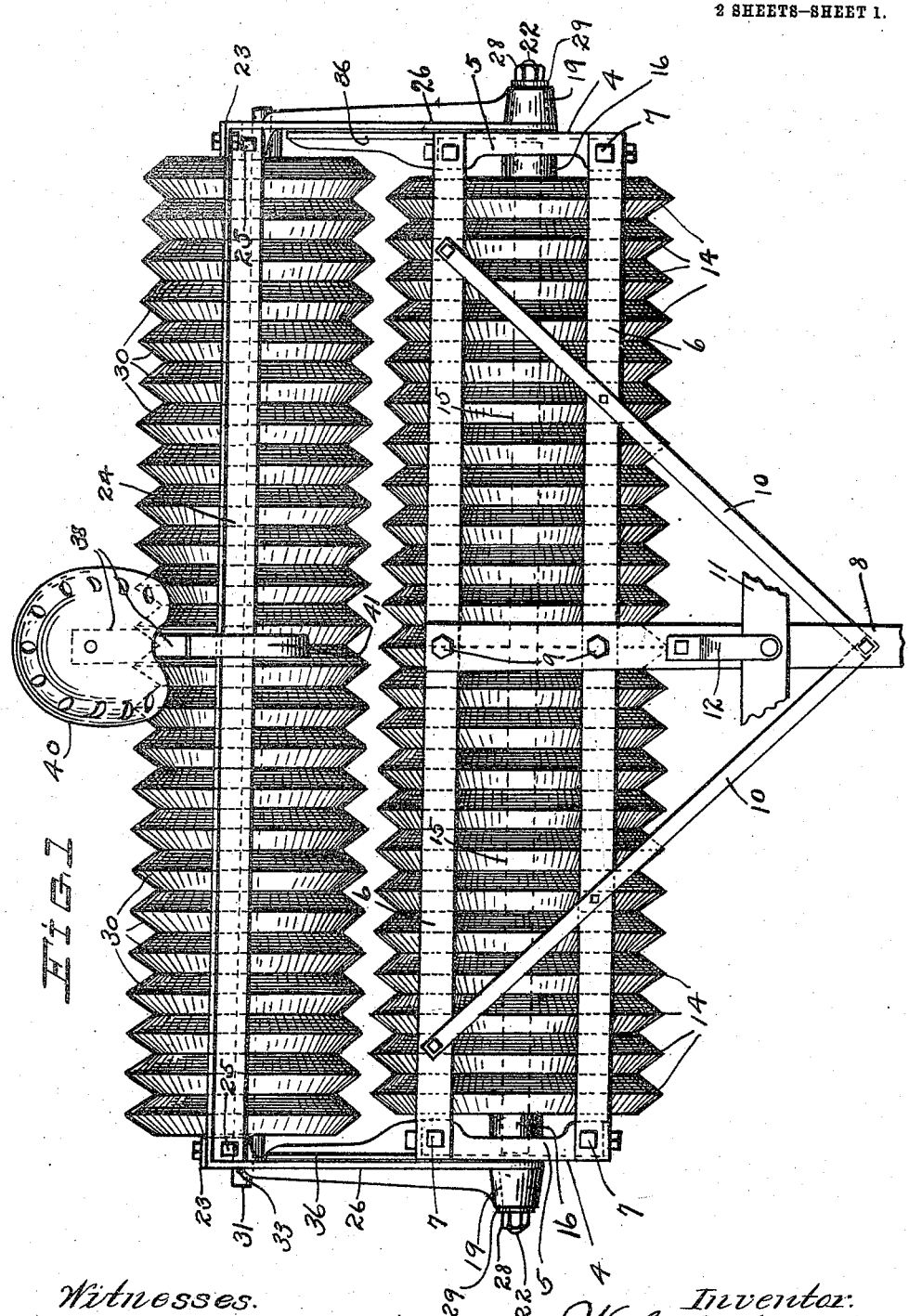

UNITED STATES PATENT OFFICE.

WILEY J. DUNHAM, OF BEREA, OHIO, ASSIGNOR TO THE DUNHAM COMPANY, OF BEREA, OHIO, A CORPORATION OF OHIO.

SOIL-PULVERIZER.

1,023,139.  Specification of Letters Patent.  Patented Apr. 16, 1912.

Application filed March 27, 1911. Serial No. 617,123.

*To all whom it may concern:*

Be it known that I, WILEY J. DUNHAM, a citizen of the United States of America, residing at Berea, in the county of Cuyahoga and State of Ohio, have invented certain new and useful Improvements in Soil-Pulverizers; and I hereby declare the following to be a full, clear, and exact description of the invention, such as will enable others skilled in the art to which it pertains to make and use the same.

This invention relates to new and useful improvements in soil pulverizers and particularly to double gang soil pulverizers having the cutting edges on the rear gang spaced intermediate the cutting edges on the front gang so that the rear gang will split the ridges formed in the ground by the front gang.

The object of this invention is to provide in a pulverizer of the character set forth means for positively preventing any transverse horizontal movement of the rear gang in relation to the front gang while leaving each gang capable of independent vertical movement.

My invention also consists in a new and improved method of coupling the rear gang to the front gang so that the shaft carrying the disks or cutting edges of the front gang will be free from any pull or strain which might be caused by the draft of the rear gang.

My invention also consists in the features of construction and combination of parts described in the specification, pointed out in the claims and illustrated in the accompanying drawings.

In the accompanying drawings Figure 1 is a top plan of a soil pulverizer embodying my invention. Fig. 2 is an end view of the same. Fig. 3 is a section on line 3—3, Fig. 2, looking in the direction indicated by the arrow. Fig. 4 is a section on line 4—4, Fig. 2, looking in the direction indicated by the arrow. Fig. 5 is a section on line 5—5, Fig. 2, looking in the direction indicated by the arrow.

Again referring to the drawings 4 represents the end brackets of the front frame. These brackets are in general triangular in shape, the apex of the triangle being to the bottom. Along the top and side edges of each end bracket 4 is formed a flange 5. The end brackets 4 are secured together by cross bars or beams 6, preferably of angle iron, and the said bars are rigidly secured to the end brackets by bolt 7. A pole 8 is rigidly secured to the bar 6 by means of bolts 9 and the said pole is braced in the usual manner by means of rods or bars 10 which are rigidly secured to the frame of the pole. To the pole 8 is secured an evener 11 by a draft-strap 12 in the usual manner.

14 represents the cutting disks of the front gang and these disks are mounted in the usual manner upon a shaft 15, as shown in Fig. 3. In order that the shaft 15 may rotate freely in its own mountings and be free from any strain or pull on the part of the rear gang the said shaft is mounted as follows: On the inner face of each of the end brackets 4 near the lower end thereof are arranged journal-forming bosses 16 having sockets 17. The ends of the shaft 15 are journaled in the said sockets 17 and do not extend through the end brackets and consequently the rotation of the shaft 15 is in no way affected by the parts of the machine mounted on the outer faces of the end brackets.

On the outer face of each of the end brackets 4 is formed a stud 19, the stud being preferably cone-shaped. A bore 20 extends through the bottom of the socket 17 and through the stud 19 and in said bore 20 is arranged a bolt 22 so that the end of the bolt extends beyond the end of the stud 19, the object of which will appear hereinafter.

The rear gang frame comprises end brackets 23 which are in general triangular in shape, the apex of the triangle being to the top. An arm or extension 26 is formed integral with each end bracket 23 and in the end of each arm or extension 26 is formed an opening 27 which is adapted to receive the stud 19 on the adjacent end frame of the front gang. The arm is held on the stud by means of a nut 28 which is secured on the end of the bolt 22, a washer 29 being preferably arranged between the nut and the end of the stud. The cutting disks 30 are mounted in the usual manner on a shaft 31 and the ends of the said shaft 31 extend through bearings 32 formed in the end brackets 23 and are secured in position by means of cotter pins 33. The disks on the rear gang are so arranged that the cutting edges thereof are intermediate of the cutting edges of the front gang in order that the cutting edges of the disks on the rear gang will cut and crush the ridges formed in the ground by the front gang. Now in order to preserve this relative arrangement of the cutting disks on the front and rear gangs I provide the following arrangement:—At the rear side of each of the end brackets of the front gang frame and preferably integral therewith is arranged a rearwardly extending member 36 which curves downwardly at its end. Each member 36 extends along the inner face of the adjacent end bracket of the rear gang frame so the said end brackets are always in contact with the said members 36 and it is therefore impossible for the rear gang to twist or shift horizontally transversely of the front gang and consequently the cutting disks on the rear gang will always retain their relative positions in regard to the cutting disks on the front gang.

The end brackets of the rear gang are united by a cross bar 24 which is secured thereto by bolts 25. The cross bar is formed of angle iron and the bar is arranged with the flange extending upwardly. At the center of the bar 24 is mounted a standard 38 for the seat which is bolted at its lower end to the flange of the cross bar 24 and at the upper end thereof is secured a seat 40. An iron brace 41 is secured at its lower end to the under side of the cross bar 24 and the upper end thereof is rigidly secured to the standard 38. The seat therefore is entirely supported on the rear gang and has no attachments or braces extending to the front gang. Now in practice, the front gang is made heavier than the rear gang so that when the operator is seated on the rear gang the weight of the operator will equalize the weight of the two gangs.

What I claim is,—

1. In a soil pulverizer, the combination of a forward frame, a rear frame pivotally connected with the forward frame so as to have independent vertical movement, a pulverizer member mounted in each frame and an arm rigidly mounted at each side of the front frame, said arms being arranged to extend rearwardly in contact with the sides of the rear frame to prevent horizontal transverse movement of the rear frame in relation to the front frame.

2. In a soil pulverizer the combination of a front frame comprising end brackets, said brackets having journals formed on the inner faces thereof and trunnion forming studs formed on the outer faces thereof and located immediately opposite said journals, bars connecting said end brackets, a shaft having its ends mounted in said journals on said end brackets, a pulverizer member mounted on said shaft, a rear frame comprising end brackets, said end brackets having arms rigid therewith which extend forwardly and are provided with openings in their ends to receive the studs on the end brackets of the front frame, means for holding said arms on said studs, a bar connecting said end brackets of the rear frame, a shaft extending between said brackets, and a pulverizer member mounted on said shaft.

3. In a soil pulverizer, the combination of a forward frame, a rear frame pivotally connected with the forward frame so as to have independent vertical movement, said frames consisting of end brackets connected by cross bars, a shaft mounted in each frame, a pulverizer member mounted on each shaft and an arm formed integral with each of the end brackets of the front frame and extending rearwardly in contact with the inner faces of the end brackets of the rear frame, the said arms being curved downwardly at their ends and a seat arranged on and wholly supported by the rear frame.

4. In a soil pulverizer, the combination of a forward frame comprising end brackets, bars connecting said end brackets, bosses formed on the inner faces of said end brackets and provided with journal forming sockets, a shaft having its ends journaled in said sockets, disks mounted on said shaft, studs formed on the outer faces of said brackets immediately opposite said bosses, each stud being provided with a bore which extends from the outer end thereof to said socket, a rear frame comprising end brackets, arms rigid with said brackets and extending forwardly therefrom and provided with openings to receive the studs on the forward end brackets, bolts for securing said arms on said studs, said bolts having their heads arranged in the sockets in the said bosses, and having their shank portions extending through the bores in the said studs, nuts arranged on the ends of said bolts, a shaft extending between the end brackets of the rear frame and disks mounted on said shaft, for the purpose set forth.

In testimony whereof, I sign the foregoing specification, in the presence of two witnesses.

WILEY J. DUNHAM.

Witnesses:
  Victor C. Lynch,
  N. L. McDonnell.

Copies of this patent may be obtained for five cents each, by addressing the "Commissioner of Patents, Washington, D. C."